United States Patent [19]
Uchino et al.

[11] Patent Number: 4,753,264
[45] Date of Patent: * Jun. 28, 1988

[54] FLOW CONTROL VALVE

[75] Inventors: Kazuyoshi Uchino; Masaya Nikaido, both of Higashimatsuyama, Japan

[73] Assignee: Jidosha Kiki Co., Ltd., Tokyo, Japan

[*] Notice: The portion of the term of this patent subsequent to Oct. 20, 2004 has been disclaimed.

[21] Appl. No.: 24,231

[22] Filed: Mar. 10, 1987

[30] Foreign Application Priority Data

Mar. 19, 1986 [JP] Japan ................................ 61-61865
Mar. 19, 1986 [JP] Japan ................................ 61-61866

[51] Int. Cl.$^4$ ........................ G05D 7/01; F16K 31/122
[52] U.S. Cl. ........................................ 137/117; 137/504
[58] Field of Search ............... 137/117, 504, 116, 118; 138/43

[56] References Cited

U.S. PATENT DOCUMENTS

| 635,829 | 10/1899 | Weston et al. | 137/504 |
|---|---|---|---|
| 1,933,852 | 11/1933 | Hahn | 137/504 |
| 2,307,949 | 1/1943 | Phillips | 137/504 X |
| 2,584,418 | 2/1952 | Branson | 137/504 |
| 2,587,815 | 3/1952 | Branson | 137/504 X |
| 2,859,762 | 11/1958 | Banker . | |
| 2,865,397 | 12/1958 | Chenault . | |
| 3,058,719 | 10/1962 | Beebee . | |
| 3,130,747 | 4/1964 | Benaway . | |
| 3,156,262 | 11/1964 | Attebo . | |
| 3,254,667 | 6/1966 | Mcguire . | |
| 3,939,859 | 2/1976 | Ueda et al. . | |
| 4,243,064 | 1/1981 | Nolte . | |
| 4,302,937 | 12/1981 | Aubert . | |
| 4,343,324 | 8/1982 | Ohe et al. . | |
| 4,361,166 | 11/1982 | Honaga et al. . | |
| 4,442,857 | 4/1984 | Ohe et al. | 137/117 |

FOREIGN PATENT DOCUMENTS

| 997250 | 9/1976 | Canada . |
|---|---|---|
| 104186 | 8/1981 | Japan . |
| 146472 | 11/1981 | Japan . |
| 4469 | 1/1982 | Japan . |
| 4470 | 1/1982 | Japan . |

Primary Examiner—Martin P. Schwadron
Assistant Examiner—Stephen M. Hepperle
Attorney, Agent, or Firm—Flynn, Thiel Boutell & Tanis

[57] ABSTRACT

A flow control valve which exhibits a so-called drooping response is provided which causes the flow rate supplied to a hydraulic instrument to be reduced as a discharge flow from a pump increases. A union is inserted into and fixedly connected to a bore which receives a spool valve, and is formed with an orifice. A sleeve having an outer diameter which varies in its axial direction is fitted around the union, thereby defining a restricted passage on the outside of the sleeve which restricts the passage of a hydraulic fluid. A pressure differential between the upstream and the downstream side of the restricted passage is effective to slide the sleeve, thereby reducing the opening of the orifice to reduce the flow rate supplied to the hydraulic instrument in a gradual manner.

8 Claims, 3 Drawing Sheets

FLOW CONTROL VALVE

BACKGROUND OF THE INVENTION

The invention relates to a flow control valve, and in particular, to such valve which exhibits a non-return drooping response, that is, providing a flow of a magnitude fed to a hydraulic instrument which decreases with an increase in a discharge flow from a pump and which is free from the influence of a pressure fluctuation in the hydraulic instrument upon the flow being fed to cause the latter to return.

A flow control valve which exhibits a response as described above is useful in providing a vehicle stability when running at high speeds and a reduction in the horsepower dissipated when used in a power steering apparatus associated with a vehicle. In conventional arrangements of this kind, an orifice is formed in a passage which supplies hydraulic fluid discharged from a pump to a hydraulic instrument, and a pressure differential across the orifice is utilized to open a spool valve to return part of the hydraulic fluid while simultaneously providing a restriction in the passage so that the orifice may be reduced by a control spool which is responsive to a pressure differential across the restriction (see Japanese Laid-Open patent application Nos. 104,186/1981 and 4,469/1982).

However, conventional flow control valves are complex in construction and require an increased number of parts, which in turn require a high accuracy in their manufacturing. In addition, a tuning of the response is difficult to achieve.

To overcome such difficulty, the present inventors have previously proposed a flow control valve having a greatly simplified construction and exhibiting a drooping response (U.S. Ser. No. 776,556, now U.S. Pat. No. 4,700,733). In this arrangement, a cylindrical union is fixedly mounted in the opening of a bore which receives a spool valve therein, and is formed with an orifice which is effective to open the spool valve in response to a pressure differential thereacross. A sleeve is fitted around the union to define a restricted passage over the outer surface of the sleeve which is effective to restrict the passage of a hydraulic fluid. A pressure difference between the upstream and the downstream side of the restricted passage causes the sleeve to slide, thus reducing the size of the orifice.

However, while successfully achieving the objective of providing a non-return drooping response with a simplified construction, the flow control valve described in the immediately preceding paragraph suffers from a limited degree of freedom in the choice of the response because the restricted passage is defined between the bore receiving the spool valve and the outer surface of the sleeve to present a constant flow area of the passage, whereby the pressure differential across the sleeve is determined only by the flow rate through the restricted passage. In addition, a retainer ring is used as one of seats against which a spring urging the sleeve abuts, leaving a certain space for improvement in respect of the number of required machining steps and the number of parts used.

SUMMARY OF THE INVENTION

Accordingly, it is an object of the invention to provide a flow control valve having a greatly simplified construction and which allows a free choice of the response.

The above object is accomplished by disposing a cylindrical union within the bore of a housing, forming an orifice in the union which is effective to open a spool valve, and fitting a sleeve having an outer diameter which varies in its axial direction around the union so that a restricted passage is formed between the outer peripheral surface of the sleeve and the internal surface of the bore in the housing.

It is a second object of the invention to provide a flow control valve having a greatly simplified construction and exhibiting a non-return drooping response and which is capable of reducing the number of machining steps and a number of parts used while improving the ease of assembly.

Such object is accomplished by disposing a cylindrical union within the bore of a housing and forming an orifice in the union which is effective to open the spool valve, with a sleeve slidably fitted around the union to define a restricted passage along the outer surface of the sleeve, and additionally including a spring which is disposed between a flange formed on one end of the union and an end face of the sleeve.

Other objects and advantages of the invention will become apparent from the following description of several embodiments thereof with respect to the drawings.

DESCRIPTION OF EMBODIMENTS

Figure 1:
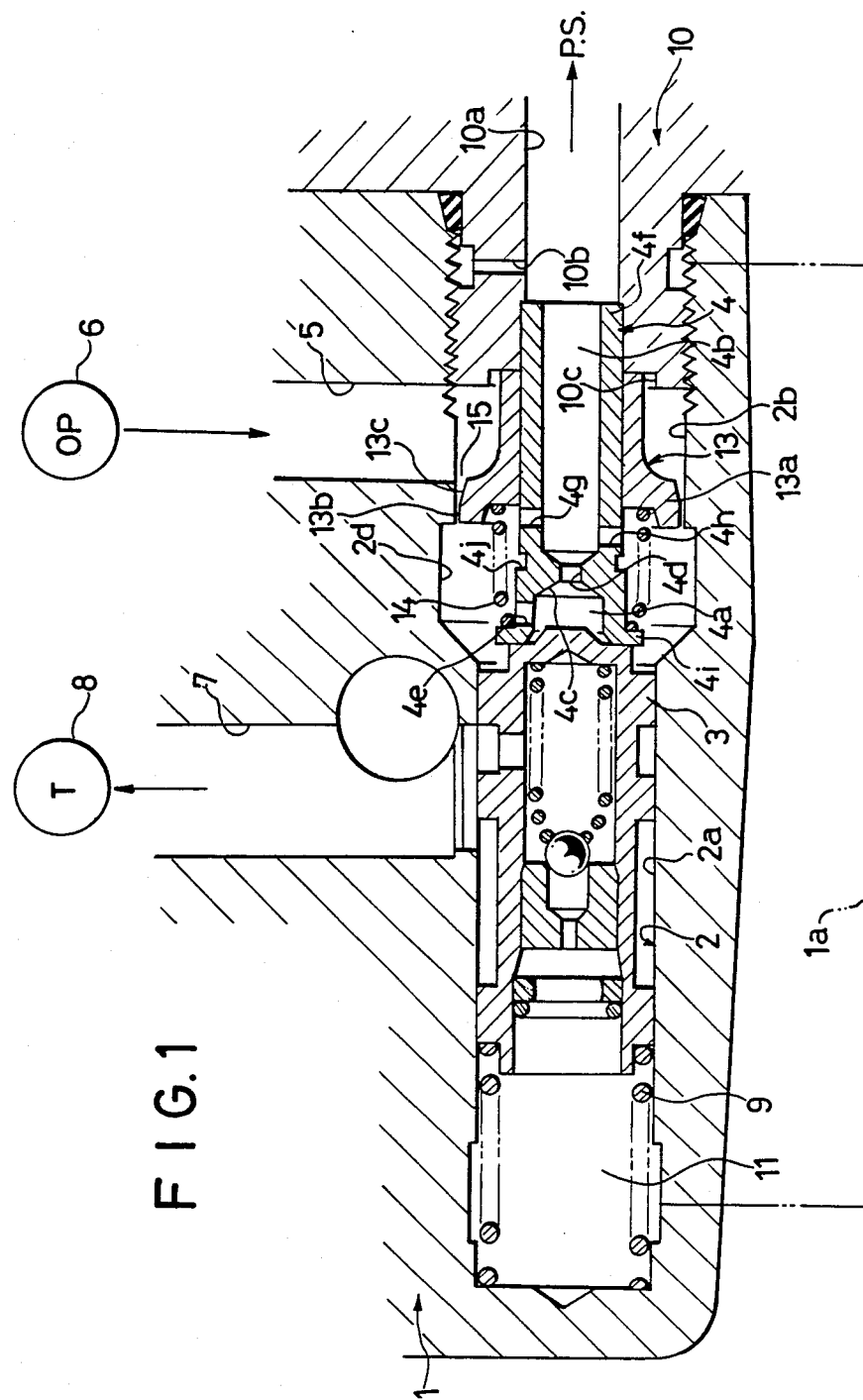
FIG. 1 is a longitudinal section of a flow control valve according to one embodiment of the invention.

Several embodiments of the invention will now be described with reference to the drawings. FIG. 1 shows a flow control valve according to one embodiment of the invention. A pump housing 1 is formed with a spool valve receiving bore 2 having an increased diameter toward its opening, and a spool valve 3 is received within a portion 2a of the bore which has a reduced diameter. A bore portion 2b having an increased diameter has a cylindrical union 4 inserted therein, which has its one end disposed as a press fit into an axial bore 10a of a connector 10. The union 4 is secured within the bore 2 by engaging the connector 10 with the housing 1. The bore portion 2b communicates with a pump 6 through a supply path 5 while the bore portion 2a communicates with a tank 8 through a return path 7. The spool valve 3 disposed within the bore portion 2a is urged by a spring 9 toward the bore portion 2b to bear against the front end face of the union 4, thus interrupting a communication between the supply path 5 and the return path 7.

The cylindrical union 4 is formed with a septum 4c at a location toward the spool valve 3, which divides the interior of the union 4 into a chamber 4a located toward the spool valve 3 and another chamber 4b located toward the connector 10. The both chambers 4a, 4b communicate with each other through a fixed orifice 4d formed in the septum 4c. It will be noted that a portion of the union 4 which is located on the side of the septum 4c which is nearer the spool valve 3 has a greater diameter than its portion located nearer the connector 10. A communication hole 4e is formed in the first mentioned portion of the connector to provide a communication between the interior of the bore 2 and the chamber 4a while a pair of orifices 4g, 4h are formed in a portion 4f of the union 4 having a reduced diameter at axially displaced locations.

Accordingly, the supply path 5 communicates with the chamber 4b in the portion 4f of the union 4 through a path including the bore 2, communication hole 4e, chamber 4a, and fixed orifice 4d and also through another path formed by the both orifices 4g, 4h, and thence is connected to a power steering apparatus PS through the axial passage 10a formed in the connector 10. It is also to be noted that the passage 10a in the connector communicates with a chamber 11 which receives the spring 9 through a radial passage 10b and a communication path 1a formed in the housing 1. Accordingly, when flow rate of hydraulic oil discharged from the pump 6 exceeds a given value, a pressure differential across the fixed orifice 4d and orifices 4g, 4h is applied across the opposite end faces of the spool valve 3, and when it overcomes the resilience of the spring 9, causes the spool valve 3 to move to the left as viewed in FIG. 1, thus returning part of the hydraulic oil fed from the pump 6 to the tank 8.

A sleeve 13 is slidably fitted around the portion 4f of the union 4 having a reduced diameter. The sleeve 13 is formed with a cylindrical portion 13a of an increased diameter, located at its end nearer the spool valve, which extends toward the spool valve. The sleeve 13 is urged toward the connector 10 by a spring 14 which is disposed between the bottom surface of the cylindrical portion 13a and a flange 4i which is formed on the end of the union 4 located adjacent to the spool valve 3, whereby it bears against the bottom surface of an annular groove 10c formed in the end face of the connector 10 to stop its movement.

The outer peripheral surface of the cylindrical portion 13a of the sleeve 13 which has an increased diameter includes a first portion 13b of uniform diameter which is disposed nearer the spool valve 3 and a tapered portion 13c having an outer diameter which decreases toward the connector 10. A clearance 15 is defined between the peripheral surface of the cylindrical portion 13a and the internal surface of the bore 2, and constitutes a restricted passage which restricts the flow rate of hydraulic oil supplied from the oil pump 6. Accordingly, when the flow rate of oil supplied from the oil pump 6 exceeds a given value, a pressure differential across the restricted passage 15 is effective to drive the sleeve 13 toward the spool valve 3 or to the left as viewed in FIG. 1, against the resilience of the spring 14.

The pair of orifices 4g, 4h are located such that they are open when the sleeve 13 remains stationary in abutment against the bottom surface of the annular groove 10c in the connector 10, but are sequentially closed by the sleeve 13 as the latter moves, thus acting as a variable orifice.

The bore 2 also includes a portion 2d of a further increased diameter in the region of a transition between the bore portions 2a and 2b or in the region extending from the end of the union 4 located adjacent to the spool valve 3 to the pair of orifices 4g, 4h.

In operation, when the pump 6 which is driven by an onboard engine operates in a lower speed range or low flow range, the spool valve 3 is urged by the spring 9 to bear against the union 4, thus interrupting a communication between the supply path 5 and the return path 7. The sleeve 13 is also urged by the spring 14 to bear against the bottom surface of the annular groove 10c in the connector 10 where it remains stationary. Accordingly, the entire amount of hydraulic oil discharged from the pump 6 is supplied to a power steering apparatus PS.

Subsequently, as the number of revolutions of the pump increases, discharge flow increases, whereby the pressure differential across the fixed orifice 4d and the orifices 4g, 4h is effective to move the spool valve 3 to the left, whereby the return path 7 begins to communicate with the flow path 5, thus returning an excessive amount of flow and maintaining the flow of hydraulic oil supplied to the power steering apparatus substantially constant.

As the number of revolutions of the pump further increases, the pressure differential across the restricted passage 15 increases and overcomes the resilience of the spring 14, thus causing the sleeve 13 to move to the left. As a consequence, the sleeve 13 initially begins to reduce the opening of the first orifice 4g and then the opening of the second orifice 4h, thus gradually increasing the amount of oil supplied to the power steering apparatus PS and increasing the pressure differential across the orifices 4g, 4h to cause a further movement of the spool valve 3 to the left to thereby increase the amount of oil returned. By reducing the amount of hydraulic oil supplied to the power steering apparatus PS in this manner, the stability of the vehicle when it is running at high speeds is enhanced while simultaneously allowing a reduction in the horsepower dissipated when the vehicle is running at higher speeds.

Figure 2:
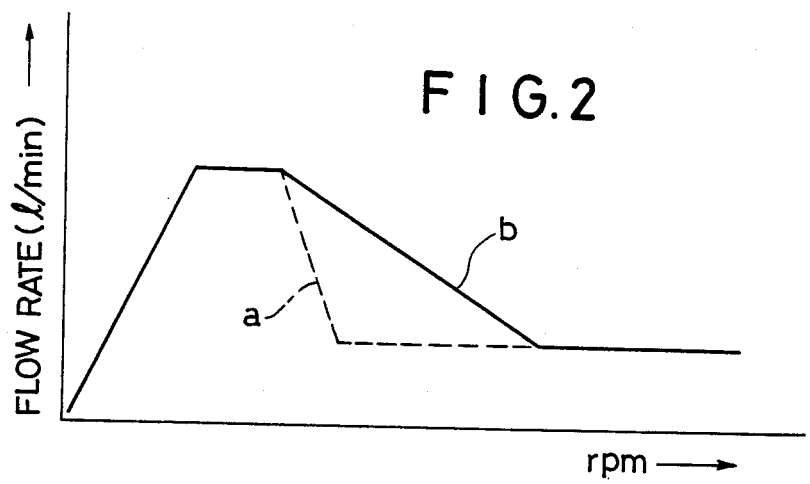
FIG. 2 graphically illustrates the response of the flow control valve shown in FIG. 1 in comparison to that of a conventional valve.
Figure 3:
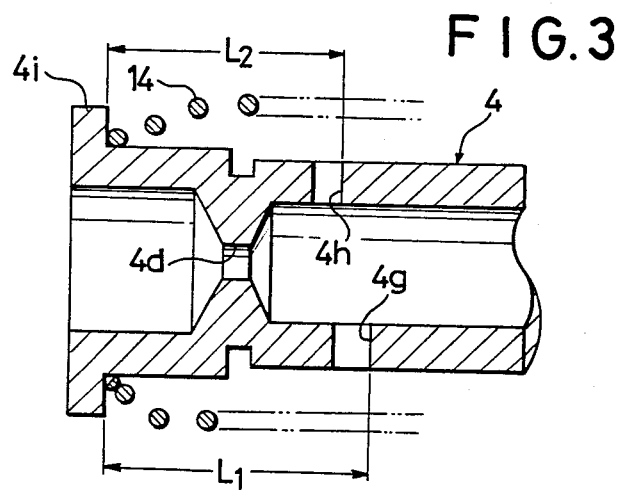
FIG. 3 is an enlarged section of a union.

As mentioned previously, the peripheral surface of the sleeve 13 is formed with the tapered portion 13c, and accordingly, as the sleeve 13 moves, the cylindrical portion 13a of the sleeve 13 having an increased diameter moves into the bore portion 2d having a further increased diameter in a manner corresponding to such movement, thereby gradually increasing the flow area of the restricted passage 15 formed between the outer peripheral surface of the sleeve and the internal surface of the bore 2, thus limiting an increase in the pressure differential across the restricted passage 15. As a consequence of such arrangement, the flow rate decreases in a gradual manner, as indicated by a solid-line curve b in FIG. 2 where a broken line curve a indicates a rapid reduction in the flow rate which occurs with a conventional sleeve. It will be appreciated that the magnitude of a reduction in the flow rate can be varied by choosing a different angle of inclination for the tapered portion 13c from that shown in the embodiment.

Figure 5:
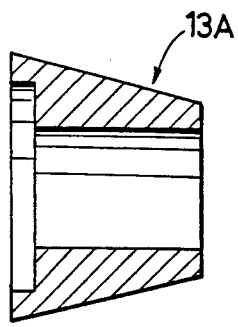
FIGS. 5 to 9 are longitudinal sections showing modifications of a sleeve.
Figure 6:
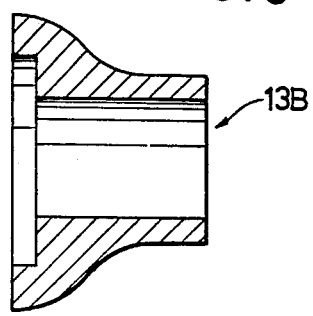
Figure 7:
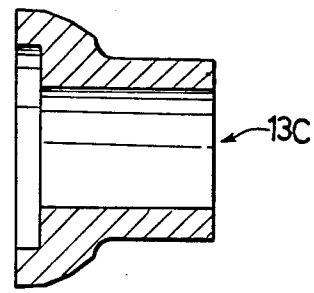
Figure 8:
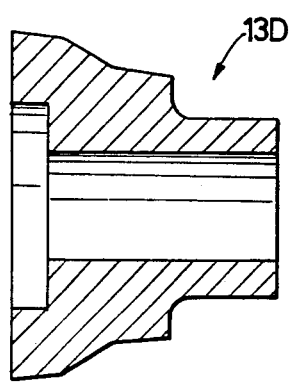
Figure 9:
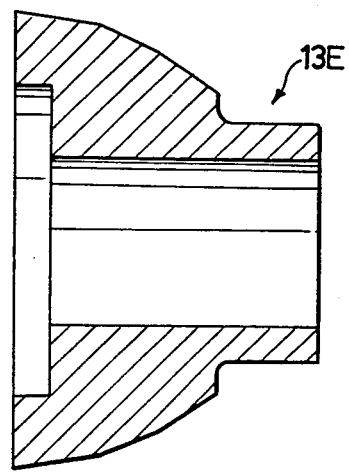

In the embodiment described above, the tapered portion 13c is formed on part of the cylindrical sleeve portion 13a, but it should be understood that the entire peripheral surface of the cylindrical portion 13a may be tapered or alternatively the entire peripheral surface of the sleeve may be tapered (see FIG. 5). As a further alternative, the tapered portion may be defined as a curved surface (see FIG. 6), thereby gradually changing the rate of the change in its outer diameter. Additionally, the tapered portion may comprise a plurality of sections having different angles of inclination (see FIGS. 7 to 9). In this manner, the flow area of the restricted passage 15 may be freely varied in a manner corresponding to a movement of the sleeve 13, thus establishing any desired response.

As the number of revolutions of the pump continues to increase, with a corresponding increase in the discharge flow from the pump, the sleeve 13 will move further to the left, and when it moves into the bore portion 2d having a further increased diameter, the restricted passage or the clearance 15 increases rapidly, thus suppressing an increase in the pressure differential between the upstream and the downstream side thereof. In this manner, the horsepower dissipated can be advantageously reduced without imposing an undue loading upon the pump 6.

If the discharge flow from the pump 6 further continues to increase, the bottom surface of the cylindrical bore portion 13a bears against a step 4j between the portions of the union 4 which have different diameters, thus ceasing a further movement of the sleeve 13.

If a pressure fluctuation occurs in the hydraulic instrument such as the power steering apparatus PS at the time the sleeve 13 has moved to the left, no change is produced in the flow rate which passes through the restricted passage 15 and hence in the pressure differential thereacross. Accordingly, the sleeve 13 does not move, and the flow rate supplied to the hydraulic instrument such as the power steering appratus PS remains unchanged.

In this manner, in the present embodiment, a drooping response is achieved with a greatly simplified construction that the restricted passage 15 is formed between the bore 2 in the housing and the sleeve 13 which is fitted around the union 4 and the pressure differential across the restricted passage is utilized to move the sleeve 13, thereby reducing the opening of the orifices 4g, 4h in a gradual manner. In addition, since the union 4, the sleeve 13 and the spring 14 are assembled together as one unit, no assembly error is involved, providing a flow control valve having a high reliability. Furthermore, since the spring 14 is assembled at a location in front of the union 4, only hydraulic oil which passes between turns of the spring 14 is the regulated flow which is supplied to the power steering apparatus PS. Accordingly, when the sleeve 13 moves to cause a flexure of the spring 14, the resulting pressure loss is reduced with little influence upon the operating response. Hence, the axial length of the spring 14 may be reduced to provide a compact overall assembly.

As a distinction from a conventional arrangement, the union 4 is integrally formed with the flange 4i which serves as a fixed seat for the spring 14, thus reducing the number of machining steps and the number of parts used, contributing to a reduction in the manufacturing cost. This also improves the ease of assembly in addition to improving the reliability and the strength.

Figure 4:
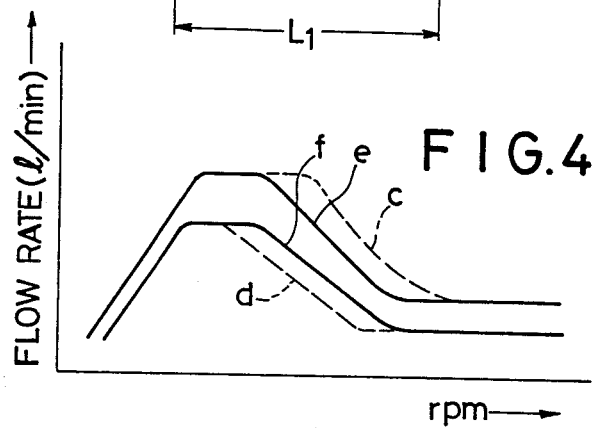
FIG. 4 graphically illustrates variations in the flow response of the embodiment and the conventional arrangement.

It will be appreciated that with a conventional arrangement, an increased number of parts used results in a disadvantage that the size of these parts tend to vary from assembly to assembly, resulting in a greater variation in the flow rate response. However, in the embodiments described, a variation in distances $L_1$ and $L_2$, measured from the end face of the flange 4i, representing one of the spring seats, to the end of the orifices 4g, 4h which are sequentially closed by the sleeve 13 as it moves can be reduced over a corresponding variation in a conventional arrangement in which a retainer ring is fitted in a groove formed in the union 4. As a result of such difference, a variation in the flow rate response achieved with the present invention can be maintained within an extent delineated between a pair of solid-line curves in FIG. 4, in contrast to a greater variation occurring with the prior art which is defined between a pair of broken line curves.

It should be understood that the union 4 is not limited to the one illustrated in configuration, but the location, the configuration and the number of fixed orifice 4d and variable orifices 4g, 4h, may be freely chosen, and that the stop for the sleeve 13 may comprise a ring fitted on the union 4 rather than the step 4j.

While the invention has been illustrated and described above in connection with several embodiments thereof, it should be understood that a number of changes, modifications and substitutions will readily occur to one skilled in the art from the above disclosure without departing from the spirit and the scope of the invention defined by the apended claims.

What is claimed is:

1. A flow control valve including an orifice formed in a supply passage which supplies hydraulic fluid discharged from a pump to a hydraulic instrument and in which a pressure differential across the orifice is effective to open a spool valve to return part of the hydraulic fluid; comprising a cylindrical union disposed in a bore formed in a housing and having a larger diameter portion joined at a step to a smaller diameter portion, said union being fixedly connected to the housing, and a sleeve fitted around the union and having an outer diameter which gradually decreases in an axial direction away from the spool valve, the union being formed with an orifice over which the sleeve may slide to regulate flow therethrough, and a restricted passage being defined between the outer peripheral surface of the sleeve and the internal surface of the bore in the housing so that a pressure differential between the upstream and the downstream side of the restricted passage is effective to slide the sleeve, thereby reducing the opening of the orifice and simultaneously effecting a gradual increase in the cross sectional area of the restricted passage caused by the widest outer diameter end of said sleeve gradually moving past said step into said larger bore portion to limit an increase in the pressure differential across the restricted passage and to cause a gradual decrease in the flow rate to the hydraulic instrument.

2. A flow control valve according to claim 1 in which the outer peripheral surface of the sleeve is partly formed with a tapered portion.

3. A flow control valve according to claim 2 in which the outer peripheral surface of the sleeve includes a first portion of uniform diameter and a second tapered portion which follows the first portion.

4. A flow control valve according to claim 1 in which the entire peripheral surface of the sleeve is tapered.

5. A flow control valve according to claim 1 in which the outer peripheral surface of the sleeve is formed with a plurality of tapered sections having different angles of inclination.

6. A flow control valve according to claim 1 in which the outer peripheral surface of the sleeve is formed with a curved surface portion.

7. A flow control valve including an orifice formed in a supply passage which supplies hydraulic fluid discharged from a pump to a hydraulic instrument and in which a pressure differential across the orifice is effective to open a spool valve, thereby returning part of the hydraulic oil; comprising a cylindrical union having the orifice formed therein and disposed within a bore in a housing and having a larger diameter portion joined at a step to a smaller diameter portion, and union being fixedly connected to the housing, a sleeve slidably fitted around the union and having an outer diameter which gradually decreases in an axial direction away from the spool valve, and a spring disposed between a flange on one end of the union and an end of the sleeve for urging the sleeve in one direction so that the orifice is open when the sleeve is not operated, so that a pressure difference between the upstream and the down stream side of a restricted passage defined by the spacing between outer surface of the sleeve and the internal surface of the bore will be effective in causing the sleeve to slide relative to the union to thereby reduce the opening of the orifice effecting a simultaneously occurring gradual increase in the cross sectional area of the restricted passage caused by the widest outer diameter end of said sleeve gradually moving past said step into said larger bore portion to limit an increase in the pressure differential across the restricted passage and to cause a gradual decrease in the flow rate to the hydraulic instrument.

8. A flow control valve according to claim 7 in which the union is fixedly connected to the housing through a connector, and in which the union, the connector to which the union is secured, the sleeve fitted around the union, and the spring disposed between the flange on the front end of the union and the end of the sleeve for urging the sleeve toward the end face of the connector are formed as an integral assembly.

* * * * *